US012789761B2

(12) United States Patent
Park

(10) Patent No.: US 12,789,761 B2
(45) Date of Patent: Nov. 10, 2026

(54) VEHICLE BRAKE FORCE DISTRIBUTION CONTROL APPARATUS AND METHOD THEREFOR

(71) Applicants: HYUNDAI MOTOR COMPANY, Seoul (KR); KIA CORPORATION, Seoul (KR)

(72) Inventor: Jeong Hwan Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 16 days.

(21) Appl. No.: 18/790,217

(22) Filed: Jul. 31, 2024

(65) Prior Publication Data

US 2025/0346215 A1 Nov. 13, 2025

(30) Foreign Application Priority Data

May 7, 2024 (KR) ........................ 10-2024-0059546

(51) Int. Cl.
*B60T 7/04* (2006.01)
*B60T 13/68* (2006.01)

(52) U.S. Cl.
CPC ............ *B60T 7/042* (2013.01); *B60T 13/686* (2013.01)

(58) Field of Classification Search
CPC ............................... B60T 7/042; B60T 13/686
USPC ............................................................ 701/70
See application file for complete search history.

(56) References Cited

U.S. PATENT DOCUMENTS

| | | | | |
|---|---|---|---|---|
| 2013/0226410 | A1 | 8/2013 | Narita et al. | |
| 2014/0145498 | A1* | 5/2014 | Yamakado | B60T 8/245 303/3 |

FOREIGN PATENT DOCUMENTS

| | | | |
|---|---|---|---|
| CN | 114987604 | A | 9/2022 |
| JP | 09-109866 | A | 4/1997 |
| JP | 2008-037259 | A | 2/2008 |
| KR | 10-0178945 | B | 3/1999 |
| KR | 2022-0055947 | A | 5/2022 |

* cited by examiner

*Primary Examiner* — Lindsay M Low
*Assistant Examiner* — Omar Morales
(74) *Attorney, Agent, or Firm* — MCDONNELL BOEHNEN HULBERT & BERGHOFF LLP

(57) ABSTRACT

A vehicle brake force distribution control apparatus is provided, having a manipulation unit selecting at least one of a parallel moving mode, a diagonal moving mode, and an in-situ turn mode, a brake pedal detection unit detecting a brake pedal open value to predict a target deceleration in the parallel moving mode or diagonal moving mode, and a sensor that outputs steering amount information and longitudinal/lateral deceleration information. The vehicle brake force distribution control apparatus additionally includes a controller that distributes a brake force of each wheel in the parallel moving mode or the diagonal moving mode according to the target deceleration, corrects the brake force of each wheel on the basis of the steering amount information and the longitudinal/lateral deceleration information, and allows a real brake force of each wheel to follow a corrected target brake force in the parallel moving mode or the diagonal moving mode.

20 Claims, 11 Drawing Sheets

VEHICLE BRAKE FORCE DISTRIBUTION CONTROL APPARATUS AND METHOD THEREFOR

CROSS-REFERENCE TO RELATED APPLICATION

This application claims, under 35 U.S.C. § 119 (a), the benefit of priority to Korean Patent Application No. 10-2024-0059546 filed on May 7, 2024, the entire contents of which are incorporated herein by reference.

BACKGROUND

(a) Technical Field

The present disclosure relates to a vehicle brake force distribution control apparatus and a method therefor, and more specifically, to a vehicle brake force distribution control apparatus capable of selectively and variably controlling brake force distribution in traveling and braking in a set specific drive mode, and a method therefor.

(b) Background Art

In general, since vehicle wheel steering is performed in only two modes (straight-forward and left/right-turn), a driver may intuitively drive a vehicle using only a few control systems. In contrast, since a 4-wheel independent steering system (4WS) controls respective wheels independently, vehicle behavior may be adjusted in various ways.

In typical front-wheel and rear-wheel drive modes, wheels turn as much as a steering wheel is turned, and acceleration occurs as much as an accelerator pedal is depressed, thereby allowing the vehicle to turn while driving the vehicle forward. Here, reverse steering of rear wheels with respect to front wheels may be determined on the basis of a vehicle speed or a steering angle, which may help to reduce a turning radius during a U-turn.

Further, in a diagonal moving mode, the rear wheels are controlled in phase with the front wheels, and yaw does not occur in the vehicle, which is advantageous in lane change or overtaking scenarios.

In a parallel moving mode, the front and rear wheels may turn by 90°, which is advantageous in parallel parking.

In addition, in an in-situ turn mode, the front and rear wheels may turn by 45°, which allows the vehicle to make a U-turn in alleys, etc.

The in-situ turn mode is one of unique drive modes of the 4WS as well as the parallel moving mode, which may appeal to customers through such distinct characteristics. However, the in-situ turn mode is a mode in which only a yaw movement of the vehicle occurs, and the yaw movement is not familiar to a vehicle driver, which may cause discomfort.

Further, in the in-situ turn mode, since a vehicle movement direction does not match a driver's field of view, the driver must turn his entire body to secure the field of view and drive the vehicle in a state of uncertainty about when to stop turning, which may increase the difficulty of the driving operation and the risk of accidents.

Conventional vehicle brake systems are designed to distribute a brake force to the front and rear wheels at a ratio of approximately 6:4, in consideration of dynamic load of the front and rear wheels. In performing driving and braking according to the above-mentioned parallel moving mode, the diagonal moving mode, and the in-situ turn mode, the brake force distribution ratio cannot be changed, which may result in unstable vehicle behaviors.

The above-described information is only for understanding of the technical background, and therefore, should not be construed as information on the prior art already known to those skilled in the art.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with prior art. An object of the present disclosure is to provide a vehicle brake force distribution control apparatus that corrects a brake force of each wheel on the basis of a steering amount and a longitudinal/lateral deceleration, and allows a real brake force of each wheel to follow a corrected target brake force in a parallel moving mode or a diagonal moving mode, thereby ensuring stable vehicle behavior in the parallel moving mode or the diagonal moving mode, and a method therefor.

In one aspect, the present disclosure provides a vehicle brake force distribution control apparatus including a manipulation unit configured to select at least one of a parallel moving mode, a diagonal moving mode, and an in-situ turn mode, a brake pedal detection unit configured to detect a brake pedal open value to predict a target deceleration in the parallel moving mode or the diagonal moving mode, a sensor configured to generate and output steering amount information and longitudinal/lateral deceleration information according to the brake pedal open value detected by the brake pedal detection unit, and a controller configured to distribute a brake force of each wheel in the parallel moving mode or the diagonal moving mode according to the target deceleration, correct the brake force of each wheel on the basis of the steering amount information and the longitudinal/lateral deceleration information output from the sensor, and allow a real brake force of each wheel to follow a corrected target brake force in the parallel moving mode or the diagonal moving mode.

In a preferred embodiment, the controller may calculate a variable brake force distribution ratio and a weight transfer ratio for each wheel on the basis of the steering amount information and the longitudinal/lateral deceleration information output from the sensor, and correct the brake force to follow the target brake force according to the calculated variable brake force distribution ratio and weight transfer ratio.

In another preferred embodiment, the controller may control an open value of a hydraulic valve for each wheel for following the target brake force, and compare hydraulic pressure information for each wheel detected from the hydraulic valve with target hydraulic pressure information of the target brake force.

In still another preferred embodiment, the controller may repeatedly control the open value of the hydraulic valve for each wheel so that the hydraulic pressure information matches the target hydraulic pressure information.

In yet another preferred embodiment, the controller may detect current hydraulic pressure information for each wheel for following the target brake force, and compare the current hydraulic pressure information with target hydraulic pressure information of the target brake force of each wheel.

In still yet another preferred embodiment, the controller may generate, in a case where the current hydraulic pressure information for each wheel exceeds the target hydraulic pressure information, driving force in the same direction as a vehicle movement direction by controlling a drive motor.

In a further preferred embodiment, the controller may generate, in a case where the current hydraulic pressure information for each wheel is lower than the target hydraulic pressure information, the brake force in a direction opposite to a vehicle movement direction by controlling a drive motor.

In another further preferred embodiment, in correcting the brake force of each wheel to follow the target brake force, the controller may operate to correct a brake force error due to a braking deviation.

In still another further preferred embodiment, the controller may determine, in a case where a yaw value output from a yaw rate sensor that belongs to the sensor exceeds a set value, that the braking deviation has occurred, and performs feedback control for correcting the brake force error for each wheel.

In yet another further preferred embodiment, the controller may distribute, in a case where the drive mode is switched to the in-situ turn mode by the manipulation unit, the brake forces for the respective wheels to be the same.

In another aspect, the present disclosure provides a method for controlling vehicle brake force distribution, including determining whether a manipulation unit is manipulated to select at least one of a parallel moving mode, a diagonal moving mode, and an in-situ turn mode, by a controller, predicting, in a case where the drive mode is switched to the parallel moving mode or the diagonal moving mode by the manipulation unit, a target deceleration according to a brake pedal open value by the controller, distributing brake forces for respective wheels in the parallel moving mode or the diagonal moving mode necessary for the target deceleration, by the controller, and performing control for correcting the distributed brake force of each wheel and allowing a real brake force of each wheel to follow a corrected target brake force in the parallel moving mode or the diagonal moving mode, by the controller.

In a preferred embodiment, the performing control for allowing the real brake force to follow the target brake force may include calculating a variable brake force distribution ratio and a weight transfer ratio for each wheel on the basis of steering amount information and longitudinal/lateral deceleration information output from a plurality of sensors, and correcting the brake force to follow the target brake force according to the calculated variable brake force distribution ratio and weight transfer ratio.

In another preferred embodiment, the performing control for allowing the real brake force to follow the target brake force may include controlling an open value of a hydraulic valve for each wheel for following the target brake force, and comparing hydraulic pressure information for each wheel detected from the hydraulic valve with target hydraulic pressure information of the target brake force.

In still another preferred embodiment, the performing control for allowing the real brake force to follow the target brake force may include repeatedly controlling the open value of the hydraulic valve for each wheel so that the hydraulic pressure information matches the target hydraulic pressure information.

In yet another preferred embodiment, the performing control for allowing the real brake force to follow the target brake force may include detecting current hydraulic pressure information for each wheel for following the target brake force, and comparing the current hydraulic pressure information with target hydraulic pressure information of the target brake force of each wheel.

In still yet another preferred embodiment, the performing control for allowing the real brake force to follow the target brake force may include generating, in a case where the current hydraulic pressure information for each wheel exceeds the target hydraulic pressure information, driving force in the same direction as a vehicle movement direction by controlling a drive motor.

In a further preferred embodiment, the performing control for allowing the real brake force to follow the target brake force may include generating, in a case where the current hydraulic pressure information for each wheel is lower than the target hydraulic pressure information, the brake force in a direction opposite to a vehicle movement direction by controlling a drive motor.

In another further preferred embodiment, the method may further include correcting a brake force error due to a braking deviation in correcting the brake force of each wheel to follow the target brake force, by the controller.

In still another further preferred embodiment, the performing control for allowing the real brake force to follow the target brake force may include determining, in a case where a yaw value output from a yaw rate sensor that belongs to the sensor exceeds a set value, that the braking deviation has occurred, and performing feedback control for correcting the brake force error for each wheel.

In yet another further preferred embodiment, the performing distributing brake forces for respective wheels may include distributing the brake forces so that the brake forces for the respective wheels are the same in a case where the drive mode is switched to the in-situ turn mode by the manipulation unit.

Other aspects and preferred embodiments of the disclosure are discussed infra.

It is to be understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example, vehicles powered by both electricity and gasoline.

The above and other features of the disclosure are discussed infra.

BRIEF DESCRIPTION OF THE DRAWINGS

The above and other features of the present disclosure will be described in detail with reference to certain exemplary embodiments thereof illustrated the accompanying drawings which are given hereinbelow by way of illustration only, and thus are not limitative of the present disclosure, and wherein.

Figure 1:
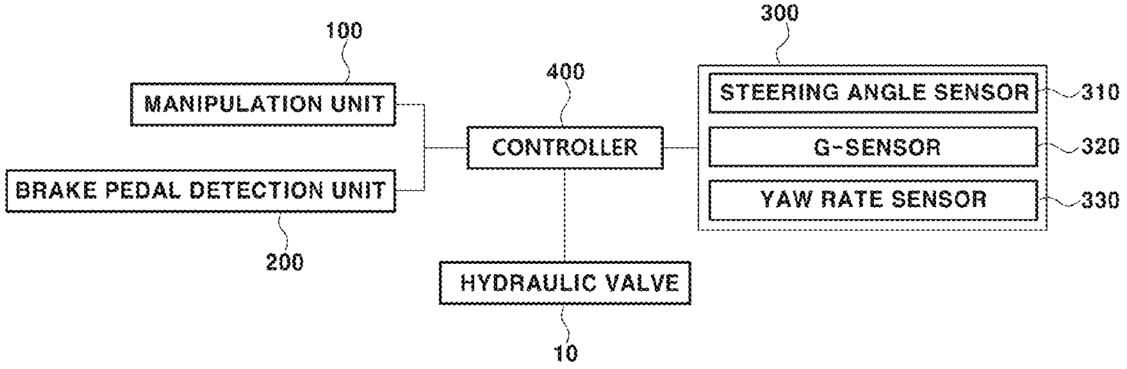
FIG. 1 is a diagram showing a vehicle brake force distribution control apparatus according to a first embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will be made in detail to various embodiments of the present disclosure, examples of which are illustrated in the accompanying drawings and described below. While the disclosure will be described in conjunction with exemplary embodiments, it will be understood that the present description is not intended to limit the disclosure to the exemplary embodiments. On the contrary, the disclosure is intended to cover not only the exemplary embodiments, but also various alternatives, modifications, equivalents and other embodiments, within the spirit and scope of the disclosure as defined by the appended claims.

Wherever possible, the same reference numbers will be used throughout the drawings to refer to the same or like parts. The terminology used herein is for the purpose of describing particular embodiments only and is not intended to limit exemplary embodiments of the disclosure. As used herein, the singular forms "a", "an", and "the" are intended to include the plural forms as well, unless the context clearly indicates otherwise. It will be further understood that the terms "comprise", "include", and "have" used herein specify the presence of stated components, steps, operations, and/or elements, but do not preclude the presence or addition of one or more other components, steps, operations, and/or elements.

Figure 2:
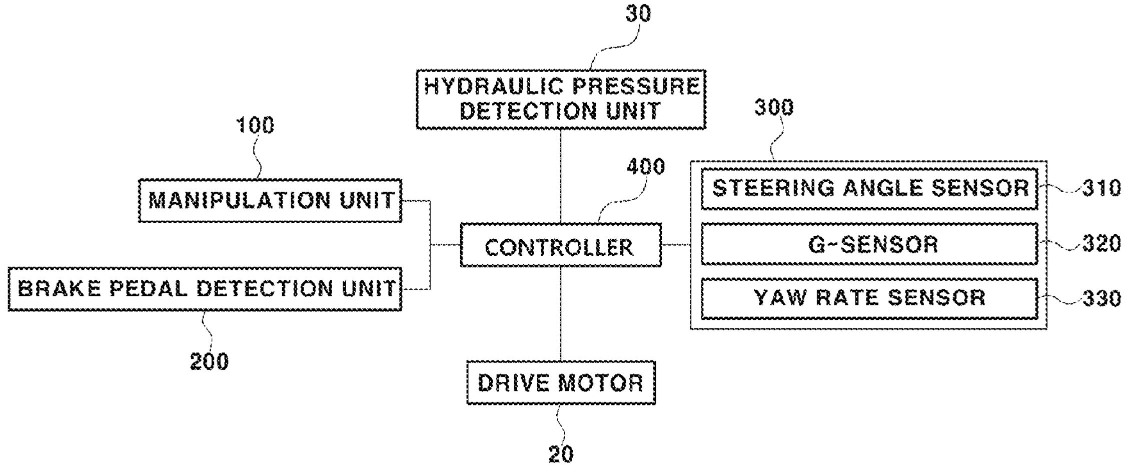
FIG. 2 is a diagram showing a vehicle brake force distribution control apparatus according to a second embodiment of the present disclosure.
Figure 3A:
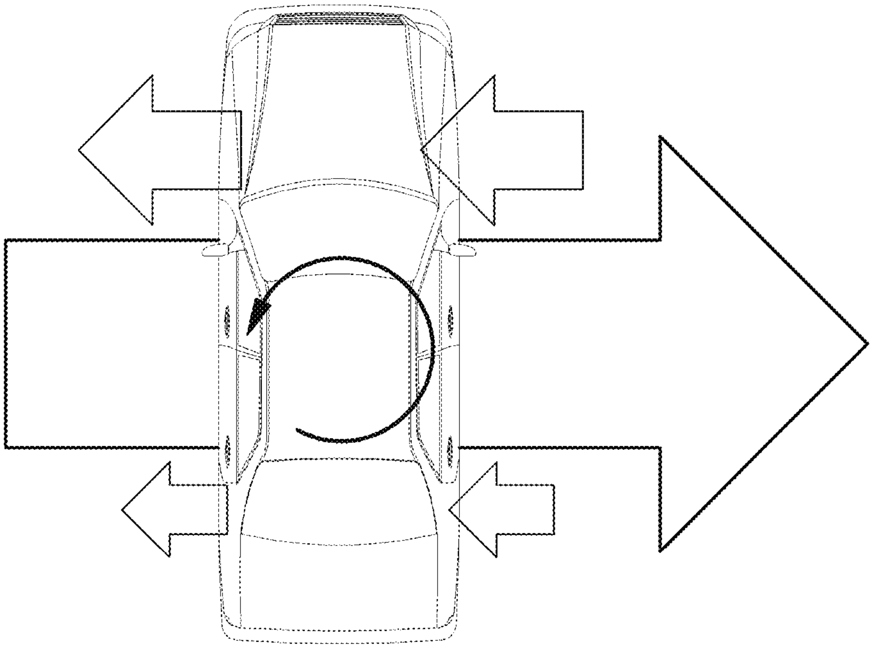
FIGS. 3A to 3C are diagrams showing a parallel moving mode, a diagonal moving mode, and an in-situ turn mode in a vehicle brake force distribution control apparatus according to an embodiment of the present disclosure.
Figure 3B:
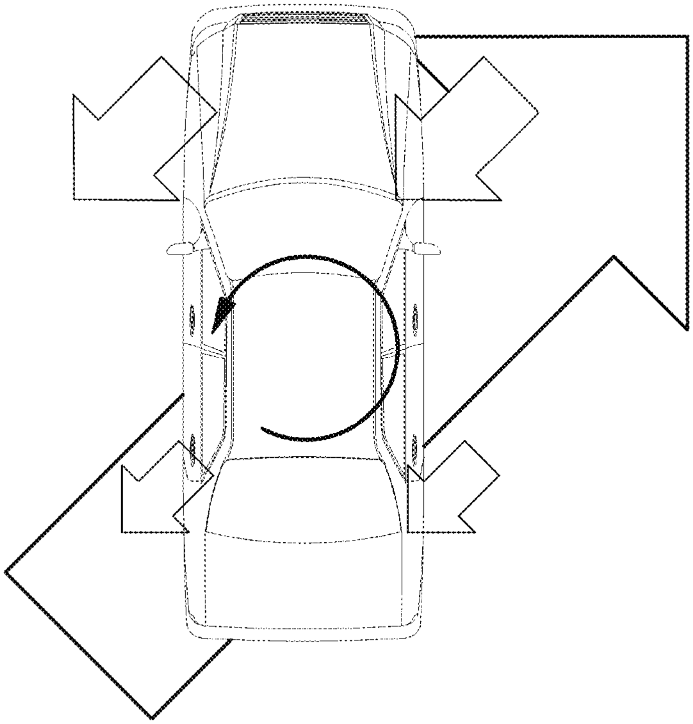
Figure 3C:
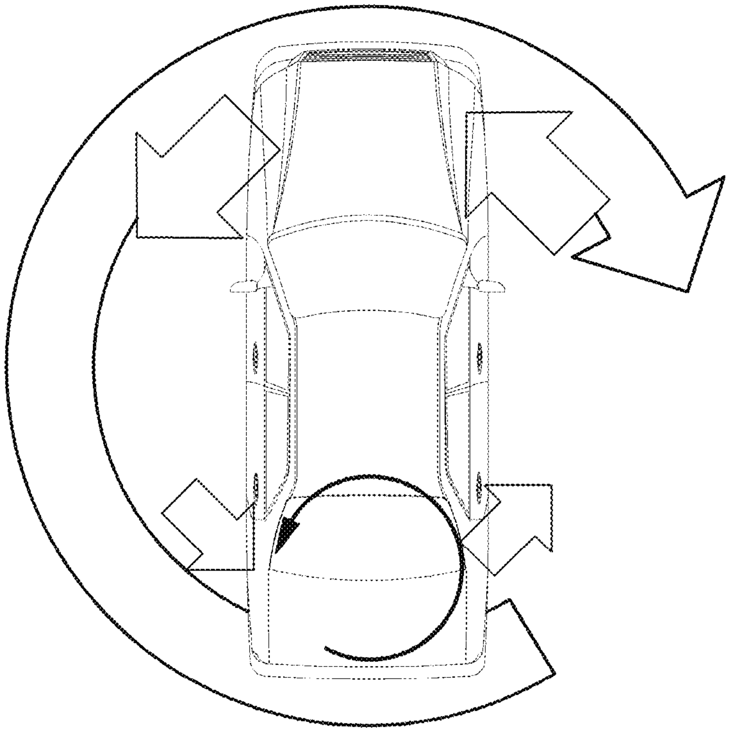

FIG. 1 is a diagram showing a vehicle brake force distribution control apparatus according to a first embodiment of the present disclosure, FIG. 2 is a diagram showing a vehicle brake force distribution control apparatus according to a second embodiment of the present disclosure, and FIGS. 3A to 3C are diagrams showing a parallel moving mode, a diagonal moving mode, and an in-situ turn mode for a vehicle brake force distribution control apparatus according to an embodiment of the present disclosure.

Figure 4:
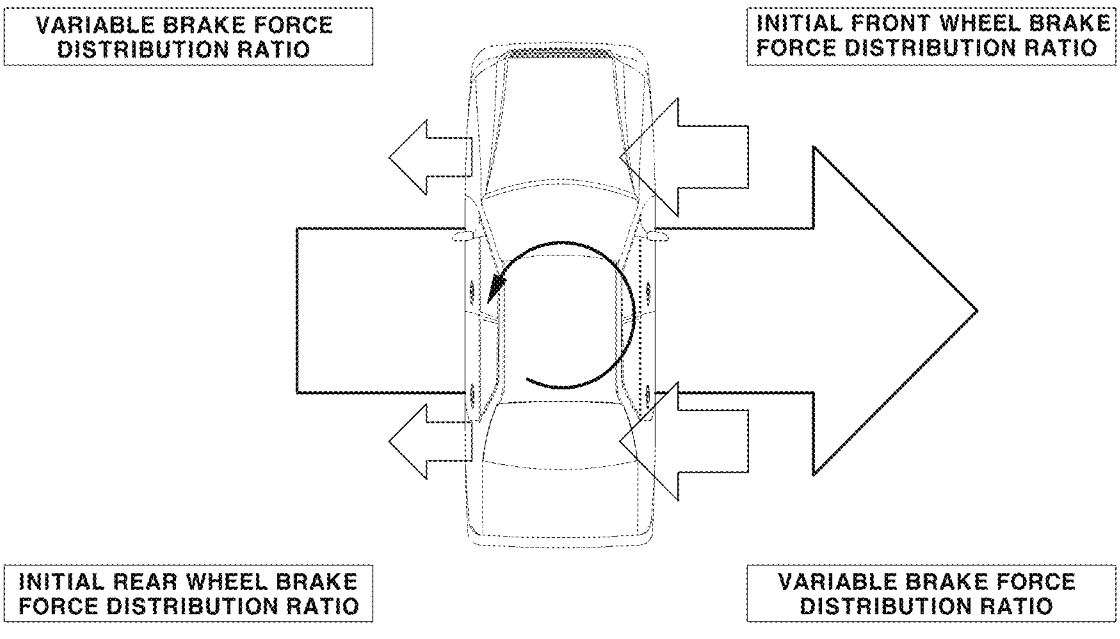
FIG. 4 is a diagram showing an example of target brake force following in a vehicle brake force distribution control apparatus according to the first embodiment of the present disclosure.
Figure 7:
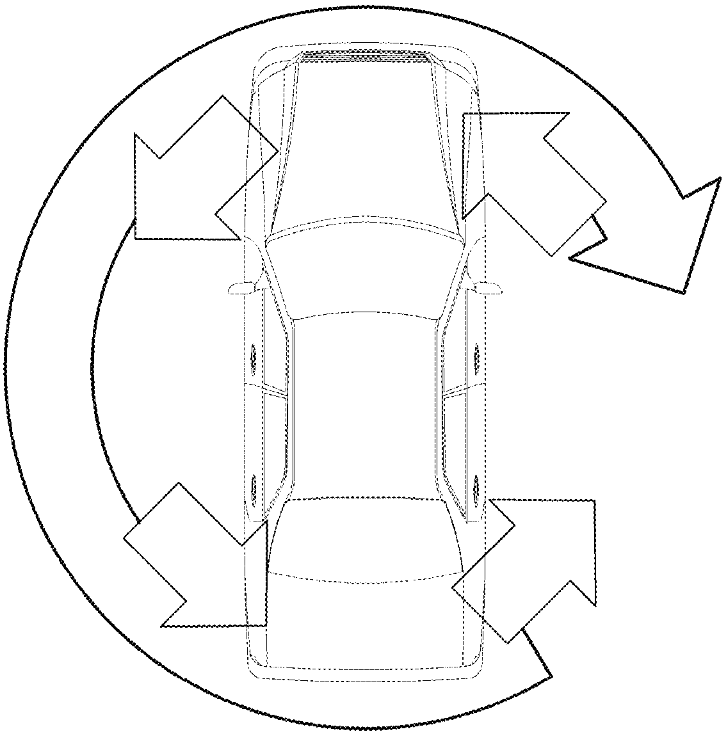
FIG. 7 is a diagram showing an example of target brake force following in a vehicle brake force distribution control apparatus according to the first embodiment of the present disclosure.
Figure 8A:
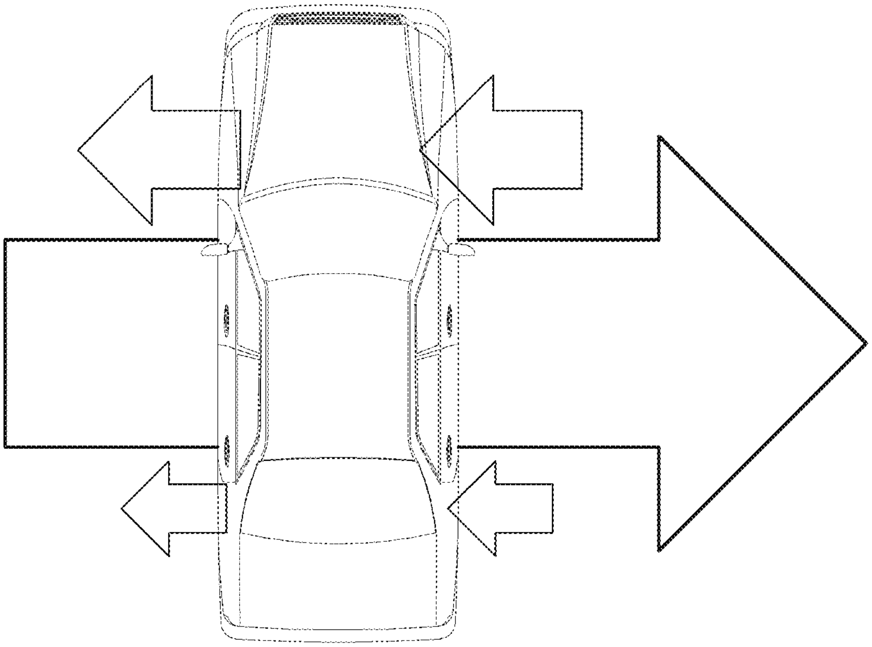
FIGS. 8A to 8C are diagrams showing an example of target brake force following in a vehicle brake force distribution control apparatus according to the second embodiment of the present disclosure.
Figure 8B:
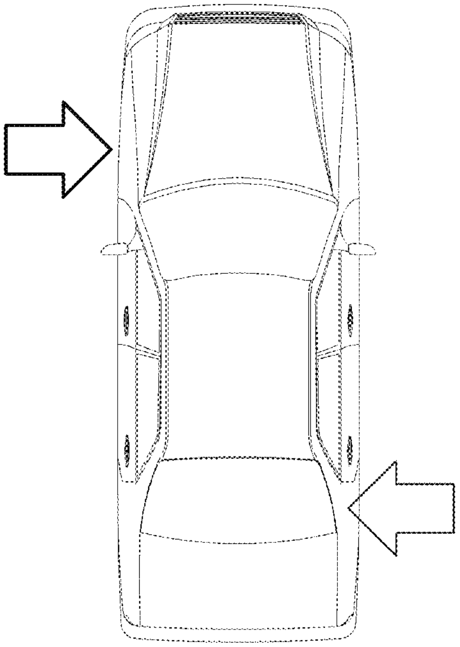
Figure 8C:
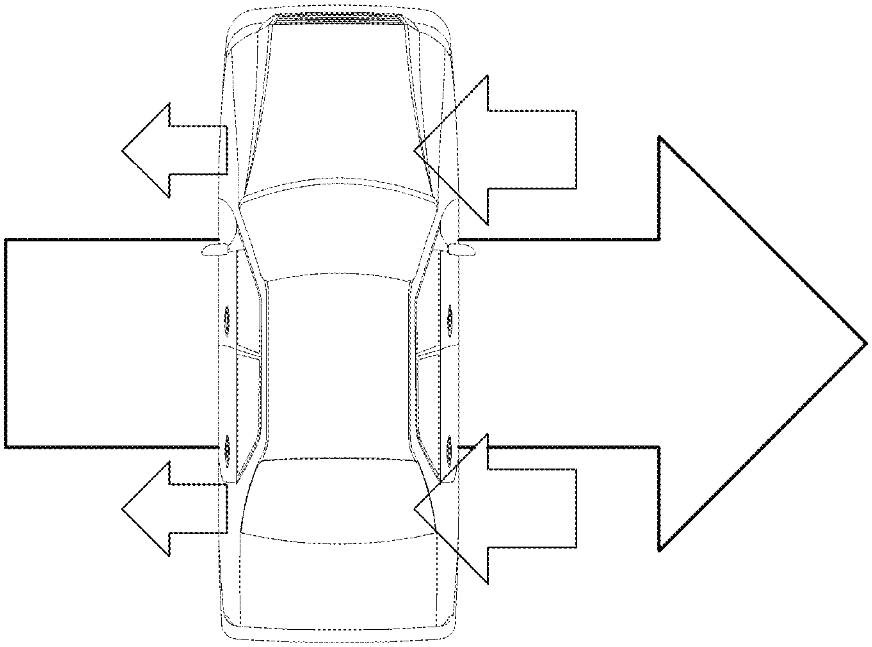
Figure 9:
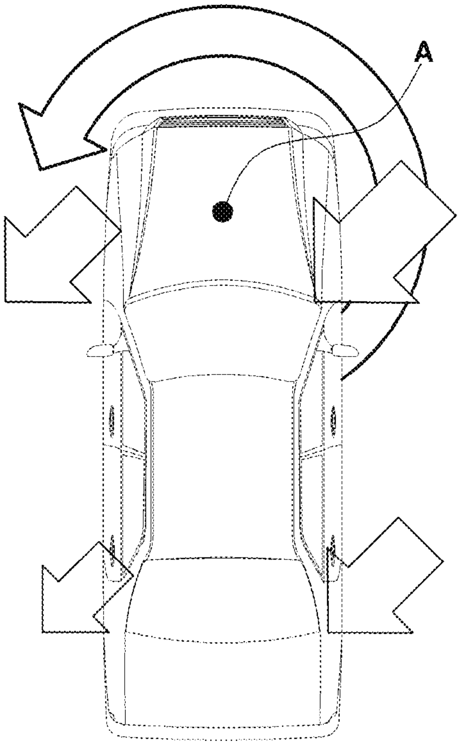
FIG. 9 is a diagram showing an example of a braking deviation in a vehicle brake force distribution control apparatus according to an embodiment of the present disclosure.
Figure 10:
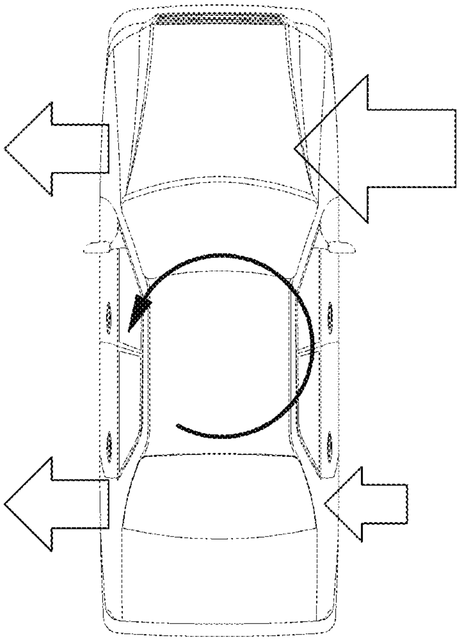
FIG. 10 is a diagram showing an example of a braking deviation in a vehicle brake force distribution control apparatus according to an embodiment of the present disclosure.

FIGS. 4 and 7 are diagrams showing an example of target brake force following in the vehicle brake force distribution control apparatus according to the first embodiment of the present disclosure, FIGS. 8A to 8C are diagrams showing an example of target brake force following in the vehicle brake force distribution control apparatus according to the second embodiment of the present disclosure, and FIGS. 9 and 10 are diagrams showing an example of a braking deviation in the vehicle brake force distribution control apparatus according to the embodiment of the present disclosure.

As shown in FIGS. 1 and 2, a vehicle brake force distribution control apparatus according to the present embodiments includes a manipulation unit 100, a brake pedal detection unit 200, a sensor 300, and a controller 400.

The manipulation unit 100 is provided to select a specific drive mode, more specifically, one of a parallel moving mode, a diagonal moving mode, or an in-situ turn mode, as shown in FIGS. 3A to 3C.

Vehicles currently in mass production are usually designed to have a front-wheel brake force greater than a rear-wheel brake force due to increased front wheel load due to load transfer, prevention of advanced locking of rear wheels, etc. during braking.

For example, a brake force ratio of front wheels to rear wheels is initially set to 6:4, and the front-wheel brake force increases from the initial ratio as a vehicle's deceleration increases.

Accordingly, in the case of a vehicle having the above-mentioned brake force ratio, in a case where one of the drive modes of the parallel moving mode, the diagonal moving mode, and the in-situ turn mode is selected by manipulating the manipulation unit 100, vehicle's behaviors may become unstable.

That is, in a case where a vehicle equipped with a brake system in which the brake force ratio of the front wheels to the rear wheels is set to 6:4 is driven in a specific drive mode such as the parallel moving mode, the diagonal moving mode or the in-situ turn mode, the right or left side of the vehicle changes to the front-wheel or rear-wheel side, and thus, during braking in the parallel moving mode, for example, the vehicle may turn due to a difference between the left and right brake forces of the front and rear wheels, thereby making the vehicle behave unstably.

Similarly, during braking in the diagonal moving mode, the vehicle may turn due to the difference between the left and right brake forces according to front-to-rear weight transfer and right-to-left weight transfer, making the vehicle behave unstably. Further, during braking in the in-situ turn mode, the vehicle's rotational center moves toward the rear wheels due to the difference between the front and rear wheel brake forces, thereby making the vehicle behave unstably.

In this regard, according to the present embodiments, the vehicle drive mode is switched to a specific drive mode such as the parallel moving mode, the diagonal moving mode, or the in-situ turn mode by the manipulation unit 100, thereby making it possible to selectively control the brake forces to solve the above-mentioned problems.

To this end, the brake pedal detection unit 200 detects a brake pedal open value to predict a target deceleration in the parallel moving mode or the diagonal moving mode.

Further, the sensor 300 generates and outputs steering amount information and longitudinal/lateral deceleration information according to the brake pedal open value detected by the brake pedal detection unit 200.

The sensor 300 may include a steering angle sensor (SAS) 310 for generating and outputting the steering amount information, and a G-sensor 320 for generating and outputting the longitudinal/lateral deceleration information.

The controller 400 distributes a brake force of each wheel in the parallel moving mode or the diagonal moving mode according to the target deceleration, corrects the brake force of each wheel on the basis of the steering amount information and the longitudinal/lateral deceleration information output from the sensor 300, and allows a real brake force of each wheel to follow a corrected target brake force in the parallel moving mode or the diagonal moving mode.

More specifically, in a case where the drive mode input from the manipulation unit 100 is switched to the parallel moving mode or the diagonal moving mode, the controller 400 predicts the target deceleration of the vehicle according to the brake pedal open value detected by the brake pedal detection unit 200, corrects the detected brake force of each wheel on the basis of the steering amount information and the longitudinal/lateral deceleration information output from the sensor 300 and the G-sensor 320, and allows the real brake force of each wheel to follow the corrected target brake force.

For example, in the parallel moving mode, in a case where the vehicle moves in parallel to the right, since the left front wheel serves as the rear wheel in the parallel moving mode, the controller 400 decreases the brake force to the same level as the left rear wheel. Similarly, since the right rear wheel serves as the front wheel, the controller 400 increases the brake force to the same level as the right front wheel. Further, the controller 400 corrects the brake forces of the left front wheel and the right rear wheel on the basis of the steering amount information and the longitudinal/lateral deceleration information, and allows a hydraulic pressure for providing the brake force of each wheel to follow a target hydraulic pressure of a set target brake force through feed forward control of the hydraulic valve 10 (see, for example, FIG. 1).

Here, in correcting the brake force as described above, the controller 400 calculates a variable brake force distribution ratio and a weight transfer ratio for each wheel on the basis of the steering amount information and the longitudinal/lateral deceleration information output from the steering angle sensor 310 and the G-sensor 320, and corrects the brake force to follow the target brake force of each wheel according to the calculated variable brake force distribution ratio and weight transfer ratio.

That is, in the parallel moving mode in the direction shown in FIG. 4, the brake force distribution ratio of the right front wheel to the left rear wheel is set to 6:4, for example, similarly to an initial distribution ratio determined by vehicle specifications, but the brake force distribution of the left front wheel and the right rear wheel is determined by a variable brake force distribution ratio as the drive mode is switched to the parallel moving mode.

In other words, the brake force distribution of the left front wheel may be determined by "variable brake force distribution ratio=initial front wheel brake force distribution ratio*cos (steering angle)+initial rear wheel brake force distribution ratio*sin (steering angle)", and the brake force distribution of the right rear wheel may be determined by "variable brake force distribution ratio=initial front wheel brake force distribution ratio*sin (steering angle)+initial rear wheel brake force distribution ratio*cos (steering angle) ".

Figure 6:
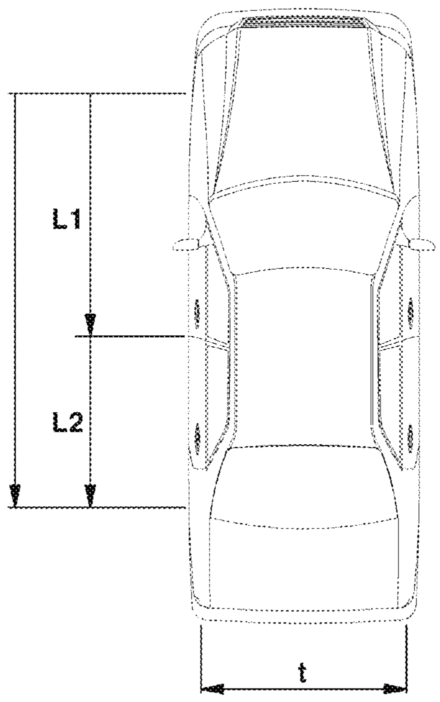
FIG. 6 is a diagram showing an example of target brake force following in a vehicle brake force distribution control apparatus according to the first embodiment of the present disclosure.

Referring to FIG. 6, front-to-rear and left-to-right weight transfer ratios may be respectively determined as "front-to-rear weight transfer (A)=L2*g+α*h/L2*g" and "left-to-right weight transfer (B)=t*g+2*β*h/t*g" (g: gravitational acceleration, α: longitudinal deceleration, β: lateral deceleration, and h: vehicle height). In this case, in the parallel moving mode in the direction shown in FIG. 4, since the right weight transfer ratio to the left transfer weight ratio is large, the right front wheel weight transfer ratio and the left front wheel weight transfer ratio are respectively determined as A*B and A/B, and the right rear wheel weight transfer ratio and the left rear wheel weight transfer ratio may be determined as 1/(A*B) and B/A, respectively.

Here, the above expressions are merely examples, and are not fixed formula. Other expressions for determining the corrected brake forces may be applied.

That is, in the parallel moving mode, for example, assuming that the brake force ratio of the right wheels to the rear wheels is set to 6:4, since the right wheels change to the front wheels, the left front wheel and the right rear wheel are corrected according to the variable brake force distribution ratio (see FIG. 4), and are corrected according to the weight transfer ratio of the respective wheels (see FIG. 5), thereby making it possible to determine the brake force of each wheel through a combination of the corrected brake forces.

Figure 5:
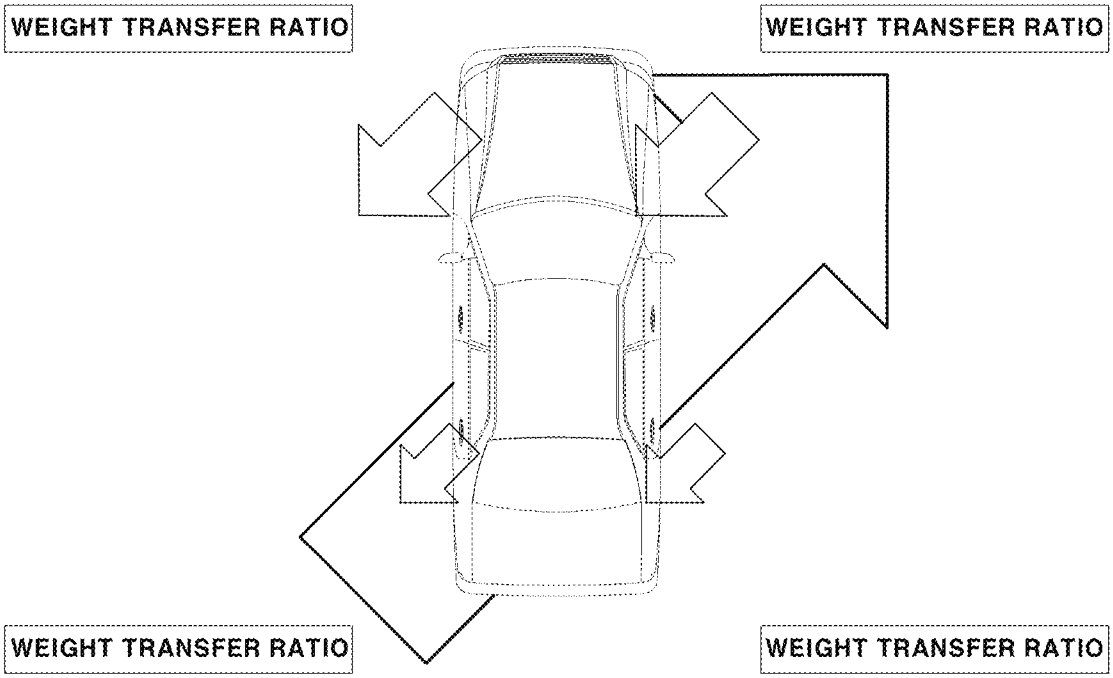
FIG. 5 is a diagram showing an example of target brake force following in a vehicle brake force distribution control apparatus according to the first embodiment of the present disclosure.

Similarly, in the diagonal moving mode in which the vehicle moves in the direction shown in FIG. 5, the brake force distribution of the left front wheel may be determined by "variable brake force distribution ratio=initial front wheel brake force distribution ratio*cos (steering angle)+initial rear wheel brake force distribution ratio*sin (steering angle)", and the brake force distribution of the right rear wheel may be determined by "variable brake force distribution ratio=initial front wheel brake force distribution ratio*sin (steering angle)+initial rear wheel brake force distribution ratio*cos (steering angle)".

Referring to FIG. 6, front-to-rear and left-to-right weight transfer ratios may be respectively determined as "front-to-rear weight transfer (A)=L2*g+α*h/L2*g" and "left-to-right weight transfer (B)=t*g+2*β*h/t*g" (g: gravitational acceleration, α: longitudinal deceleration, B: lateral deceleration, and h: vehicle height). In the diagonal moving mode in the direction shown in FIG. 5, since the brake force of the right front wheel is the largest and the brake force of the left rear wheel is the smallest according to the weight transfer ratios, the right front wheel weight transfer ratio and the left rear wheel weight transfer ratio are respectively determined as A*B and 1/(A*B), and the left front wheel weight transfer ratio and the right rear wheel transfer ratio may be determined as A/B and B/A, respectively.

Here, the above expressions are merely examples, and are not fixed formula, and other expressions for determining the corrected brake forces may be applied.

That is, in the diagonal moving mode, for example, assuming that the brake force ratio of the right wheels to the rear wheels is set to 6:4, since the brake force distribution of the left front wheel and the right rear wheel is first corrected according to the variable brake force distribution ratio, and is secondly corrected according to the weight transfer ratio of the respective wheels, thereby making it possible to determine the brake force of each wheel through a combination of the consecutively corrected brake forces.

As described above, in the parallel moving mode or the diagonal moving mode, in a case where the brake force of each wheel is corrected according to the variable brake force distribution ratio and the weight transfer ratio, respectively, the controller 400 controls the open value of the hydraulic valve 10 for each wheel to follow the target brake force according to the corrected brake force, and compares hydraulic pressure information for each wheel detected from the hydraulic valve 10 and target hydraulic pressure information of the target brake force.

Here, the controller 400 repeatedly controls the open value of the hydraulic valve 10 for each wheel so that the hydraulic pressure information matches the target hydraulic pressure information, to thereby perform feed forward control for causing the hydraulic pressure for each wheel to follow the target hydraulic pressure, and thus, it is possible to improve vehicle stability during braking in the parallel moving mode or the diagonal moving mode.

In addition to the control of the hydraulic valve 10 described above, the controller 400 according to the present embodiment may allow the real brake force of each wheel to follow the corrected target brake force in the parallel moving mode or the diagonal moving mode under the control of a drive motor 20, for a vehicle that is not equipped with an electric booster, as shown in FIG. 2.

That is, the controller 400 may operate to apply the driving or brake force only to a specific target wheel. To this end, the controller 40 detects current hydraulic pressure information for each wheel for following the target brake force by a hydraulic pressure detection unit 30 (see FIG. 2), and compares the current hydraulic pressure information with the target hydraulic pressure information of the target brake force of each wheel.

Here, in a case where the current hydraulic pressure for each wheel exceeds the target hydraulic pressure, the controller 400 controls the drive motor 20 to generate driving force in the same direction as a vehicle movement direction, and in a case where the current hydraulic pressure for each wheel is lower than the target hydraulic pressure, the controller 400 controls the drive motor 20 to generate driving force in a direction opposite to the vehicle movement direction.

For example, as shown in FIG. 8A, in the parallel moving mode in which the vehicle is moving to the right, the right front wheel brake force and the left rear wheel brake force may be determined according to an initial distribution ratio determined by vehicle specifications, but since the left front wheel changes to the rear wheel and the right rear wheel changes to the front wheel depending on the vehicle movement direction, the brake forces must be selectively varied.

Accordingly, for a vehicle equipped with the drive motor 20 corresponding to an in-wheel motor, as shown in FIG. 8B, the controller 400 controls the drive motor 20, in a case where the current hydraulic pressure for the left front wheel exceeds the target hydraulic pressure, to generate driving force in the same direction as the vehicle movement direction, and controls the drive motor 20, in a case where the current hydraulic pressure for the right rear wheel is determined to be less than the target hydraulic pressure, to generate an additional driving force in a direction opposite to the vehicle movement direction, thereby making it possible to finally generate the same brake force for the changed front and rear wheels, as shown in FIG. 8C.

In correcting the brake force of each wheel to follow the target brake force as described above, the controller 400 may operate to correct a brake force error due to a braking deviation.

That is, in a case where the vehicle moves according to a steering angle, which is detected by the steering angle sensor 310, the controller 400 determines that a braking deviation occurs in a case where a yaw value detected by a yaw rate sensor 330 that belongs to the sensor 300 exceeds a set value, and performs feedback control for correcting a brake force error for each wheel.

More specifically, even though the left and right brake forces are the same, for example, in a case in which the vehicle's weight distribution is excessively different from a set value, in a case in which a road or road friction is not uniform, or in a case where performance of the brake system is excessively different from a set value due to overheating, etc., differential braking may occur.

For example, in the parallel moving mode or diagonal moving mode, in a case in which the center of gravity (A) of the vehicle is biased toward the front side of the vehicle, as shown in FIG. 9, or in a case in which the brake force of each wheel is controlled to follow the target brake force but the brake force for any one wheel does not reach the target brake force level, as shown in FIG. 10, during traveling and braking in the parallel moving mode or the diagonal moving mode, the vehicle may turn (spin).

Accordingly, in a case in which the yaw value exceeds the set value, the controller 400 determines that unintended vehicle behavior, that is, differential braking, has occurred during braking in the parallel moving mode or diagonal moving mode, and performs feedback control for reducing a brake force error with respect to the target brake force, and thus, it is possible to effectively secure the stability of the vehicle's behaviors even in the state of the differential braking as described above.

As described above, the controller 400 may perform the brake force distribution in the in-situ turn mode, as well as in the parallel moving mode or the diagonal moving mode.

That is, in a case in which the drive mode is switched to the in-situ turn mode by the manipulation unit 100, the controller 400 may distribute the brake forces for the respective wheels to be the same. For example, assuming that a total necessary brake force is 20, the controller 400 may operate to distribute the brake force of 5 to each wheel, as shown in FIG. 7.

Figure 11:
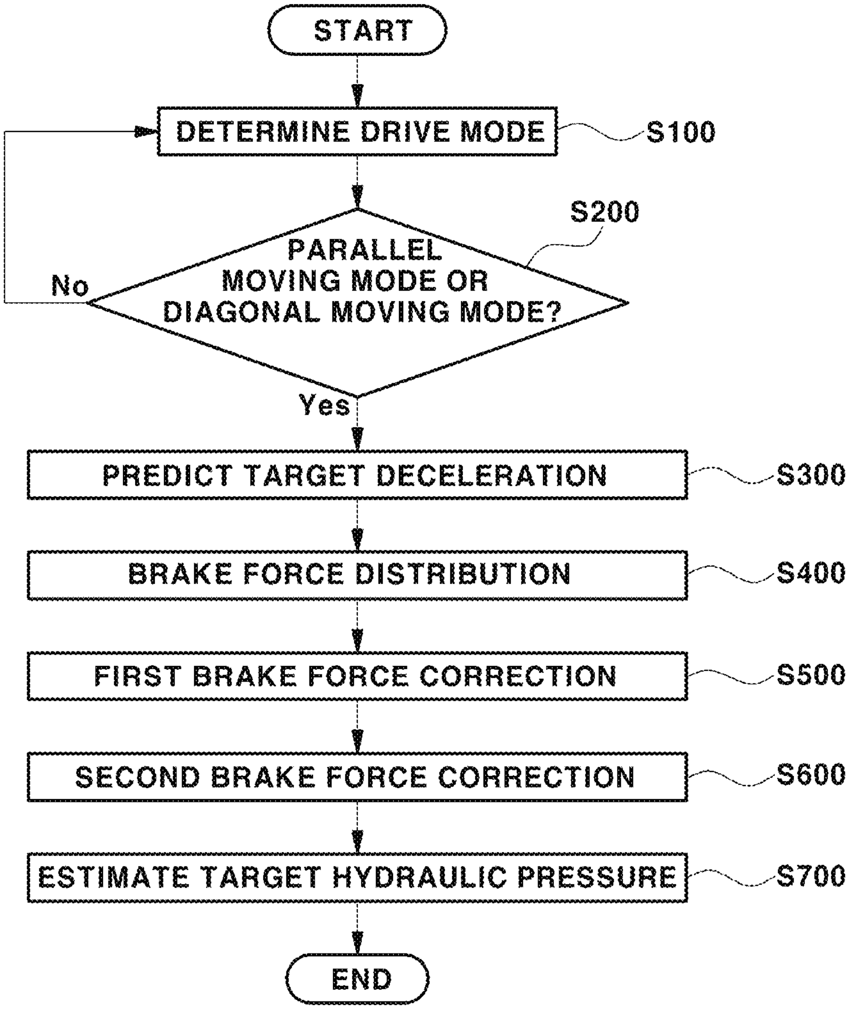
FIG. 11 is a diagram sequentially showing a vehicle brake force distribution control method according to another embodiment of the present disclosure.
Figure 12:
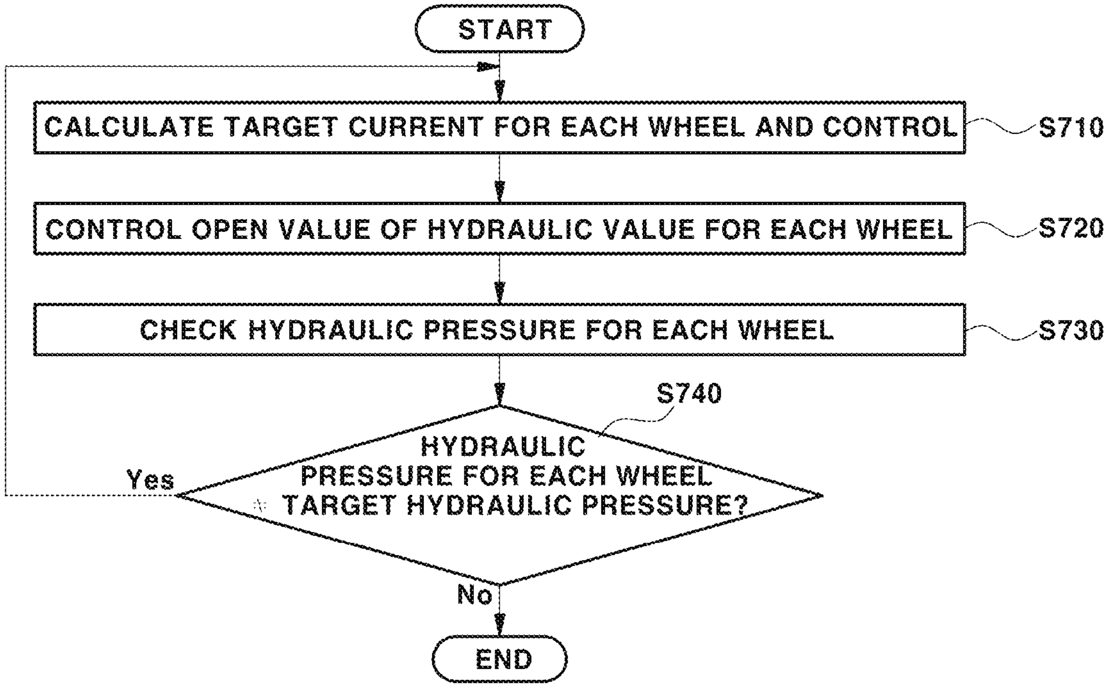
FIG. 12 is a diagram showing a first example of a vehicle brake force distribution control method according to another embodiment of the present disclosure.

FIG. 11 is a diagram sequentially showing a vehicle brake force distribution control method according to another embodiment of the present disclosure, and FIG. 12 is a diagram showing a first example of the vehicle brake force distribution control method according to this embodiment.

Figure 13:
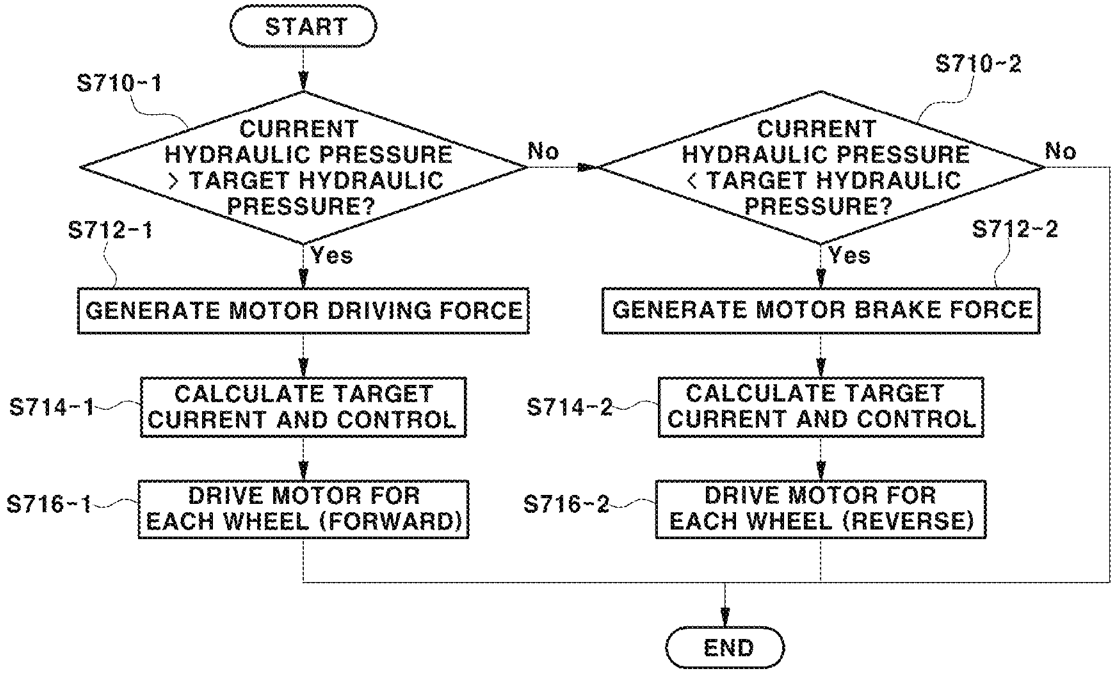
FIG. 13 is a diagram showing a second example of a vehicle brake force distribution control method according to another embodiment of the present disclosure.
Figure 14:
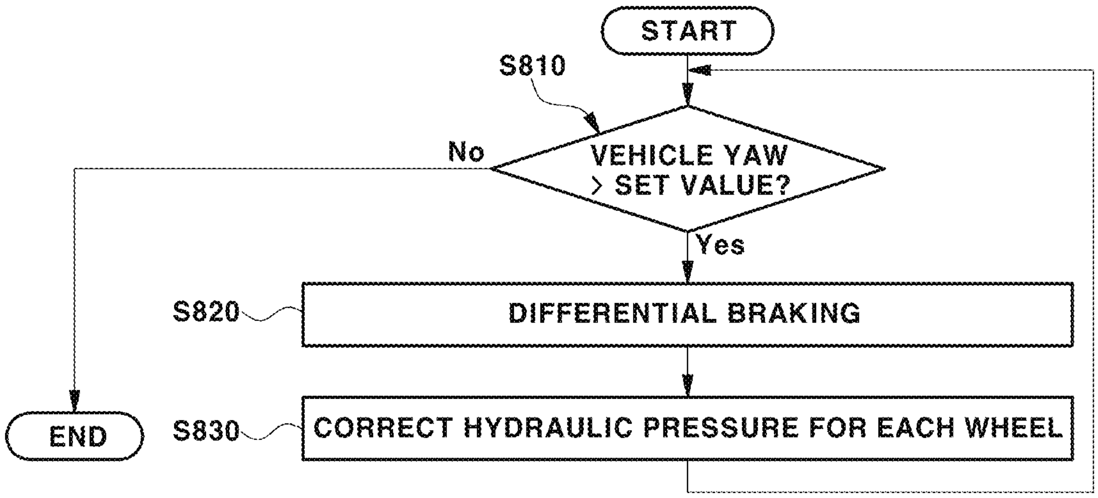
FIG. 14 is a diagram showing braking deviation correction in a vehicle brake force distribution control method according to another embodiment of the present disclosure.

FIG. 13 is a diagram showing a second example of the vehicle brake force distribution control method according to this embodiment, and FIG. 14 is a diagram showing braking deviation correction in the vehicle brake force distribution control method according to this embodiment.

Hereinafter, the vehicle brake force distribution control method according to the present embodiment will be sequentially described with reference to FIG. 11.

First, in order to select one of the parallel moving mode, the diagonal moving mode, and the in-situ turn mode as a drive mode, it is determined whether there is a manipulation through the manipulation unit 100, by the controller 400 (S100).

For example, in a case in which a vehicle equipped with a brake system in which the brake force ratio of the front wheels to the rear wheels is set to 6:4 is driven in a specific drive mode such as the parallel moving mode, the diagonal moving mode or the in-situ turn mode, the right or left side of the vehicle changes to the front-wheel or rear-wheel side, and thus, during braking in the parallel moving mode, for example, the vehicle may turn due to the difference between the left and right brake forces of the front and rear wheels, thereby making the vehicle behave unstably.

Similarly, during braking in the diagonal moving mode, the vehicle may turn due to the difference between the left and right brake forces according to front-to-rear weight transfer and right-to-left weight transfer, thereby making the vehicle behave unstably. Further, during braking in the in-situ turn mode, the vehicle's rotation center moves toward the rear wheels due to the difference between the front and rear wheel brake forces, thereby making the vehicle behave unstably.

In order to solve the problem, in the present embodiment, it is determined whether the vehicle drive mode is switched to a specific drive mode such as the parallel moving mode, the diagonal moving mode, or the in-situ turn mode in determining whether there is the manipulation through the manipulation unit 100 (S100). In a case where it is determined that the drive mode is switched to the specific mode, the brake force is selectively controlled through the controller 400.

To this end, in a case in which the specific drive mode is selected by the manipulation unit 100 (S100), as the drive mode is switched to the parallel moving mode or the diagonal moving mode as the specific drive mode (S200), the controller 400 predicts a target deceleration according to a brake pedal open value (S300), and performs brake force distribution for each wheel in the parallel moving mode or the diagonal moving mode (S400).

For example, in the parallel moving mode, in a case in which the vehicle moves in parallel to the right according to a general front-to-rear wheel brake force ratio, since the left front wheel serves as the rear wheel in the parallel moving mode, the controller 400 decreases the brake force to the same level as in the left rear wheel. Similarly, since the right rear wheel serves as the front wheel, the controller 400 increases the brake force to the same level as in the right front wheel.

Here, the controller 400 performs correction on the basis of the steering amount information and the longitudinal/lateral deceleration information (S500 and S600), and allows a hydraulic pressure for providing the brake force of each wheel to follow a target hydraulic pressure of a set target brake force through feed forward control of the hydraulic valve 10 (S700).

More specifically, the controller 400 first corrects the brake force of each wheel using the steering amount information output from the steering angle sensor (SAS) 310 (S500), and secondly corrects the brake force of each wheel using the longitudinal/lateral deceleration information output from the G-sensor 320 (S600).

Here, in FIG. 11, an example in which the first correction (S500) and the second correction (S600) are sequentially performed by the controller 400 is shown, but the first correction (S500) and the second correction (S600) are preferably performed simultaneously for brake force correction.

Here, the first correction (S500) and the second correction (S600) are simultaneously performed as follows.

In the parallel moving mode, the brake force distribution ratio of the right front wheel to the left rear wheel is set to 6:4, for example, similarly to an initial distribution ratio determined by vehicle specifications, but the brake force distribution of the left front wheel and the right rear wheel is determined by a variable brake force distribution ratio.

In other words, the brake force distribution of the left front wheel may be determined by "variable brake force distribution ratio=initial front wheel brake force distribution ratio*cos (steering angle)+initial rear wheel brake force distribution ratio*sin (steering angle)", and the brake force distribution of the right rear wheel may be determined by "variable brake force distribution ratio=initial front wheel brake force distribution ratio*sin (steering angle)+initial rear wheel brake force distribution ratio*cos (steering angle) ".

Referring to FIG. 6, front-to-rear and left-to-right weight transfer ratios may be respectively determined as "front-to-rear weight transfer (A)=L2*g+α*h/L2*g" and "left-to-right weight transfer (B)=t*g+2*β*h/t*g" (g: gravitational acceleration, α: longitudinal deceleration, β: lateral deceleration, and h: vehicle height). In this case, in the parallel moving mode in the direction shown in FIG. 4, since the right weight transfer ratio to the left transfer weight ratio is large, the right front wheel weight transfer ratio and the left front wheel weight transfer ratio are respectively determined as A*B and A/B, and the right rear wheel weight transfer ratio and the left rear wheel weight transfer ratio may be determined as 1/(A*B) and B/A, respectively.

Here, the above expressions are merely examples, and are not fixed formula, and other expressions for determining the corrected brake forces may be applied.

That is, in the parallel moving mode, for example, assuming that the brake force ratio of the right wheels to the rear wheels is set to 6:4, since the right wheels changes to the front wheels, the left front wheel and the right rear wheel are corrected according to the variable brake force distribution ratio (see FIG. 4), and are corrected according to the weight transfer ratio of the respective wheels (see FIG. 5), thereby making it possible to determine the brake force of each wheel through a combination of the corrected brake forces.

Similarly, in the diagonal moving mode in which the vehicle moves in the direction shown in FIG. 5, the brake force distribution of the left front wheel may be determined by "variable brake force distribution ratio=initial front wheel brake force distribution ratio*cos (steering angle)+initial rear wheel brake force distribution ratio*sin (steering angle)", and the brake force distribution of the right rear wheel may be determined by "variable brake force distribution ratio=initial front wheel brake force distribution ratio*sin (steering angle)+initial rear wheel brake force distribution ratio*cos (steering angle)".

Referring to FIG. 6, front-to-rear and left-to-right weight transfer ratios may be respectively determined as "front-to-rear weight transfer (A)=L2*g+α*h/L2*g" and "left-to-right weight transfer (B)=t*g+2*β*h/t*g" (g: gravitational acceleration, α: longitudinal deceleration, β: lateral deceleration, and h: vehicle height). In the diagonal moving mode in the direction shown in FIG. 5, since the brake force of the right front wheel is the largest and the brake force of the left rear wheel is the smallest according to the weight transfer ratios, the right front wheel weight transfer ratio and the left rear wheel weight transfer ratio are respectively determined as A*B and 1/(A*B), and the left front wheel weight transfer ratio and the right rear wheel transfer ratio are determined as A/B and B/A, respectively.

Here, the above expressions are merely examples, and are not fixed formulae, and other expressions for determining the corrected brake forces may be applied.

That is, in the diagonal moving mode, for example, assuming that the brake force ratio of the right wheels to the rear wheels is set to 6:4, since the left front wheel and the right rear wheel are first corrected according to the variable brake force distribution ratio, and are secondly corrected according to the weight transfer ratio of the respective wheels, thereby making it possible to determine the brake force of each wheel through a combination of the consecutively corrected brake forces.

As described above, in the parallel moving mode or the diagonal moving mode, in a case where the brake force of each wheel is first and secondly corrected (S500 and S600) according to the variable brake force distribution ratio and the weight transfer ratio, respectively, as shown in FIG. 12, the controller 400 calculates a target current for each wheel according to the corrected brake force (S710), and controls an open value of the hydraulic valve 10 for each wheel to follow the target brake force (S720).

Here, the controller 400 checks the hydraulic pressure according to the open value of the hydraulic valve 10 for each wheel (S730), and compares the hydraulic pressure information for each wheel with the target hydraulic pressure information for the target brake force of each wheel.

Here, the controller 400 repeatedly controls the open value of the hydraulic valve 10 for each wheel so that the hydraulic pressure information matches the target hydraulic pressure information (S740), and performs feed forward control for allowing the hydraulic pressure for each wheel to follow the target hydraulic pressure, thereby improving the stability of movement in braking in the parallel moving mode or the diagonal moving mode.

As another embodiment for following the target brake force, as shown in FIG. 13, a method of performing control by comparing the current hydraulic pressure information with the target hydraulic pressure information of the target brake force may be applied to a vehicle not equipped with an electric booster.

That is, the controller 400 may operate to apply the driving or brake force only to a specific target wheel. To this end, the controller 400 detects current hydraulic pressure information for each wheel for following the target brake force, and compares the current hydraulic pressure information with the target hydraulic pressure information of the target brake force of each wheel.

Here, in a case in which the current hydraulic pressure for each wheel exceeds the target hydraulic pressure (S710-1), the controller 400 determines that a motor driving force for the corresponding wheel should be generated (S712-1), calculates a target current for controlling driving force generation of the drive motor 20 (S714-1), and generates the driving force in the same direction as the vehicle's movement direction (S716-1).

In a case in which the current hydraulic pressure for each wheel is smaller than the target hydraulic pressure (S710-2), the controller 400 determines that a motor brake force for the corresponding wheel should be generated (S712-2), calculates a target current for controlling brake force generation of the drive motor 20 (S714-2), and generates the brake force in a direction opposite to the vehicle movement direction (S716-2).

For example, as shown in FIG. 8A, in the parallel moving mode in which the vehicle moves in the right direction, the right front wheel brake force and the left rear wheel brake force may be determined according to an initial distribution ratio determined by vehicle specifications, but since the left front wheel changes to the rear wheel and the right rear wheel changes to the front wheel depending on the movement direction, the brake forces must be selectively varied.

Accordingly, for a vehicle equipped with the drive motor 20 corresponding to an in-wheel motor, as shown in FIG. 8B, the controller 400 controls the drive motor 20, in a case where the current hydraulic pressure for the left front wheel exceeds the target hydraulic pressure, to generate driving force in the same direction as the vehicle movement direction, and controls the drive motor 20, in a case where the current hydraulic pressure for the right rear wheel is less than the target hydraulic pressure, to generate an additional driving force in a direction opposite to the vehicle movement direction, thereby making it possible to finally generate the same brake force for the changed front and rear wheels, as shown in FIG. 8C.

In correcting the brake force of each wheel to follow the target brake force as described above, the controller 400 may operate to correct a brake force error due to a braking deviation, as shown in FIG. 14.

That is, in a case in which the vehicle moves according to a steering angle detected by the steering angle sensor 310, in a case where a yaw value detected by a yaw rate sensor 330 that belongs to the sensor 300 exceeds a set value (S810), the controller 400 determines that a braking deviation has occurred (S820), and performs feedback control for correcting a brake force error for each wheel by correcting the hydraulic pressure of the hydraulic valve 10 (S830).

More specifically, even though the left and right brake forces are the same, for example, in a case where the vehicle's weight distribution is excessively different from a set value, in a case where a road or road friction is not uniform, or in a case where performance of the brake system is excessively different from a set value due to overheat, etc., differential braking may occur.

For example, in the parallel moving mode or diagonal moving mode, in a case where the center of gravity (A) of the vehicle is biased toward the front side of the vehicle, as shown in FIG. 9, or in a case where the brake force of each wheel is controlled to follow the target brake force, as shown in FIG. 10, but the brake force for any one wheel does not reach the target brake force level, during traveling and braking in the parallel moving mode or diagonal moving mode, the vehicle may turn (spin).

Accordingly, in a case in which the yaw value exceeds the set value (S810), the controller 400 determines that an unintended vehicle's behavior, that is, differential braking, has occurred during braking in the parallel moving mode or diagonal moving mode (S820), and performs feedback control for reducing a brake force error with respect to the target brake force through hydraulic pressure correction for each wheel (S830), and thus, it is possible to effectively secure the stability of the vehicle's behaviors even in the state of the differential braking as described above.

As described above, the controller 400 may perform the brake force distribution in the in-situ turn mode, as well as the parallel moving mode or the diagonal moving mode.

That is, in determining whether there is a manipulation of the manipulation unit 100 to select one of the parallel moving mode, the diagonal moving mode, and the in-situ turn mode (S100), for example, in a case where the drive mode is switched to the in-situ turn mode, the controller 400 may distribute the brake forces for the respective wheels to be the same. For example, assuming that a total necessary brake force is 20, the controller 400 may operate to distribute the brake force of 5 to each wheel, as shown in FIG. 7.

According to the present disclosure, it is possible to correct the brake force of each wheel according to the steering amount and longitudinal/lateral deceleration in the parallel moving mode or diagonal moving mode, and control the actual brake force to follow the corrected target brake force, thereby securing stable vehicle behaviors in a special drive mode such as the parallel moving mode or the diagonal moving mode.

Further, according to the present disclosure, it is possible to perform brake force distribution so that the brake forces for the respective wheels are the same in the in-situ turn mode, thereby securing stable vehicle behavior in a special drive mode such as the in-situ turn mode.

Furthermore, according to the present disclosure, it is possible to correct, in a plurality of situations where a brake force error may occur due to braking deviation during braking in the parallel moving mode or diagonal moving mode, the brake force error of each wheel through feedback control, thereby providing optimal braking performance and stable vehicle behavior.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

What is claimed is:

1. A vehicle brake force distribution control apparatus comprising:

a manipulator configured to select at least one of a parallel moving mode, a diagonal moving mode, and an in-situ turn mode;

a brake pedal detector configured to detect a brake pedal open value to predict a target deceleration in the parallel moving mode or the diagonal moving mode;

a sensor configured to generate and output steering amount information and longitudinal/lateral deceleration information according to the brake pedal open value detected by the brake pedal detector; and a controller configured to distribute a brake force of each wheel in the parallel moving mode or the diagonal moving mode according to the target deceleration, correct the brake force of each wheel based on the steering amount information and the longitudinal/lateral deceleration information output from the sensor, and allow a real brake force of each wheel to follow a corrected target brake force in the parallel moving mode or the diagonal moving mode, wherein the controller adjusts a variable brake force distribution ratio according to each drive mode.

2. The apparatus according to claim 1, wherein the controller calculates the variable brake force distribution ratio and a weight transfer ratio for each wheel based on the steering amount information and the longitudinal/lateral deceleration information output from the sensor, and corrects the brake force to follow the target brake force according to the calculated variable brake force distribution ratio and weight transfer ratio.

3. The apparatus according to claim 2, wherein the controller controls an open value of a hydraulic valve for each wheel for following the target brake force, and compares hydraulic pressure information for each wheel detected from the hydraulic valve with target hydraulic pressure information of the target brake force.

4. The apparatus according to claim 3, wherein the controller repeatedly controls the open value of the hydraulic valve for each wheel so that the hydraulic pressure information matches the target hydraulic pressure information.

5. The apparatus according to claim 2, wherein the controller detects current hydraulic pressure information for each wheel for following the target brake force, and compares the current hydraulic pressure information with target hydraulic pressure information of the target brake force of each wheel.

6. The apparatus according to claim 5, wherein the controller generates, in a case where the current hydraulic pressure information for each wheel exceeds the target hydraulic pressure information, driving force in the same direction as a vehicle movement direction by controlling a drive motor.

7. The apparatus according to claim 5, wherein the controller generates, in a case where the current hydraulic pressure information for each wheel is lower than the target hydraulic pressure information, the brake force in a direction opposite to a vehicle movement direction by controlling a drive motor.

8. The apparatus according to claim 1, wherein, in correcting the brake force of each wheel to follow the target brake force, the controller performs control for correcting a brake force error due to a braking deviation.

9. The apparatus according to claim 8, wherein the controller determines, in a case where a yaw value output from a yaw rate sensor that belongs to the sensor exceeds a set value, that the braking deviation has occurred, and performs feedback control for correcting the brake force error for each wheel.

10. The apparatus according to claim 1, wherein the controller distributes, in a case where a drive mode is switched to the in-situ turn mode by the manipulator, the brake forces for the respective wheels to be the same.

11. A vehicle brake force distribution control method, comprising:

determining whether a manipulator is manipulated to select at least one of a parallel moving mode, a diagonal moving mode, and an in-situ turn mode, by a controller;

predicting, in a case where a drive mode is switched to the parallel moving mode or the diagonal moving mode by the manipulator, a target deceleration according to a brake pedal open value by the controller;

distributing brake forces for respective wheels in the parallel moving mode or the diagonal moving mode necessary for the target deceleration, by the controller;

performing control for correcting the distributed brake force of each wheel and allowing a real brake force of each wheel to follow a corrected target brake force in the parallel moving mode or the diagonal moving mode, by the controller; and adjusting a variable brake force distribution ratio according to each drive mode, by the controller.

12. The method according to claim 11, wherein the performing control for allowing the real brake force to follow the target brake force, comprises: calculating the variable brake force distribution ratio and a weight transfer ratio for each wheel based on steering amount information and longitudinal/lateral deceleration information output from a plurality of sensors, and correcting the brake force to follow the target brake force according to the calculated variable brake force distribution ratio and the weight transfer ratio.

13. The method according to claim 12, wherein the performing control for allowing the real brake force to follow the target brake force, comprises: controlling an open value of a hydraulic valve for each wheel for following the target brake force, and comparing hydraulic pressure information for each wheel detected from the hydraulic valve with target hydraulic pressure information of the target brake force.

14. The method according to claim 13, wherein the performing control for allowing the real brake force to follow the target brake force, comprises: repeatedly controlling the open value of the hydraulic valve for each wheel so that the hydraulic pressure information matches the target hydraulic pressure information.

15. The method according to claim 12, wherein the performing control for allowing the real brake force to follow the target brake force, comprises: detecting current hydraulic pressure information for each wheel for following the target brake force, and comparing the current hydraulic pressure information with target hydraulic pressure information of the target brake force of each wheel.

16. The method according to claim 15, wherein the performing control for allowing the real brake force to follow the target brake force, comprises: generating, in a case where the current hydraulic pressure information for each wheel exceeds the target hydraulic pressure information, driving force in the same direction as a vehicle movement direction by controlling a drive motor.

17. The method according to claim 15, wherein the performing control for allowing the real brake force to follow the target brake force, comprises: generating, in a case where the current hydraulic pressure information for each wheel is lower than the target hydraulic pressure information, the brake force in a direction opposite to a vehicle movement direction by controlling a drive motor.

18. The method according to claim 11, further comprising: correcting a brake force error due to a braking deviation in correcting the brake force of each wheel to follow the target brake force, by the controller.

19. The method according to claim 18, wherein the performing control for allowing the real brake force to follow the target brake force, comprises: determining, in a case where a yaw value output from a yaw rate sensor that belongs to the sensor exceeds a set value, that the braking deviation has occurred, and performing feedback control for correcting the brake force error for each wheel.

20. The method according to claim 11, wherein the performing distributing brake forces for respective wheels comprises: distributing the brake forces so that the brake forces for the respective wheels are the same in a case where the drive mode is switched to the in-situ turn mode by the manipulator.

* * * * *